US012658379B2

(12) United States Patent
Knopsnyder et al.

(10) Patent No.: US 12,658,379 B2
(45) Date of Patent: Jun. 16, 2026

(54) INTERCONNECT STRIP FOR AN ULTRACAPACITOR MODULE

(71) Applicant: AVX Corporation, Fountain Inn, SC (US)

(72) Inventors: Jonathan R. Knopsnyder, Fountain Inn, SC (US); Shawn Hansen, Simpsonville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 54 days.

(21) Appl. No.: 16/019,687

(22) Filed: Jun. 27, 2018

(65) Prior Publication Data

US 2019/0006126 A1 Jan. 3, 2019

Related U.S. Application Data

(60) Provisional application No. 62/527,345, filed on Jun. 30, 2017.

(51) Int. Cl.

| | |
|---|---|
| *H01G 11/72* | (2013.01) |
| *H01G 11/10* | (2013.01) |
| *H01G 11/28* | (2013.01) |
| *H01G 11/34* | (2013.01) |
| *H01G 11/76* | (2013.01) |

(Continued)

(52) U.S. Cl.
CPC ............. *H01G 11/72* (2013.01); *H01G 11/10* (2013.01); *H01G 11/28* (2013.01); *H01G 11/34* (2013.01); *H01G 11/76* (2013.01); *H01G 11/78* (2013.01); *H01G 11/52* (2013.01); *H01G 11/60* (2013.01); *H01G 11/68* (2013.01)

(58) Field of Classification Search
CPC ........... H01G 11/76; H01G 9/008; H01G 2/04
See application file for complete search history.

(56) References Cited

U.S. PATENT DOCUMENTS

| | | | | |
|---|---|---|---|---|
| 5,150,283 | A | * | 9/1992 | Yoshida ................. H01G 11/38 |
| | | | | 361/502 |
| 6,186,831 | B1 | * | 2/2001 | Tsai ......................... H01R 4/34 |
| | | | | 174/70 B |

(Continued)

FOREIGN PATENT DOCUMENTS

| | | |
|---|---|---|
| CN | 200983379 Y | 11/2007 |
| CN | 101826607 A | 9/2010 |

(Continued)

OTHER PUBLICATIONS

Machine Translation of JP 11067184 A (Year: 1999).*

(Continued)

*Primary Examiner* — Eric W Thomas
(74) *Attorney, Agent, or Firm* — Dority & Manning, P.A.

(57) ABSTRACT

A module comprises a first ultracapacitor having a first terminal, a second ultracapacitor having a second terminal, and an interconnect strip is provided. The interconnect strip contains a central section positioned between a first attachment section and a second attachment section. The first terminal of the first ultracapacitor is connected to the first attachment section of the strip and the second terminal of the second ultracapacitor is connected to the second attachment section of the strip. Further, the central section is formed from a flexible conductive material.

23 Claims, 3 Drawing Sheets

(51) Int. Cl.
| | |
|---|---|
| *H01G 11/78* | (2013.01) |
| *H01G 11/52* | (2013.01) |
| *H01G 11/60* | (2013.01) |
| *H01G 11/68* | (2013.01) |

(56) References Cited

U.S. PATENT DOCUMENTS

| | | | |
|---|---|---|---|
| 7,016,177 B1 | 3/2006 | Thrap | |
| 7,027,290 B1 | 4/2006 | Thrap | |
| 7,180,726 B2 | 2/2007 | Thrap | |
| 7,382,600 B2 | 6/2008 | Paul et al. | |
| 7,440,258 B2 | 10/2008 | Thrap et al. | |
| 7,511,942 B2 | 3/2009 | Thrap | |
| 7,830,646 B2 | 11/2010 | Eilertsen | |
| 7,859,826 B2 | 12/2010 | Thrap et al. | |
| 7,859,844 B2 | 12/2010 | Nguyen et al. | |
| 8,098,483 B2 | 1/2012 | Eilertsen | |
| 9,711,298 B2 | 7/2017 | Yoo et al. | |
| 9,801,307 B2 | 10/2017 | Iskanius et al. | |
| 2003/0223179 A1 | 12/2003 | Mishima et al. | |
| 2006/0281252 A1 | 12/2006 | Oversteyns | |
| 2007/0008678 A1* | 1/2007 | Fresard | H01G 2/04 |
| | | | 361/502 |
| 2007/0053140 A1 | 3/2007 | Soliz | |
| 2007/0195486 A1 | 8/2007 | Paul et al. | |
| 2009/0229849 A1* | 9/2009 | Yang | H02G 5/005 |
| | | | 174/68.2 |
| 2009/0274956 A1 | 11/2009 | Kosugi et al. | |
| 2010/0053927 A1* | 3/2010 | Inoue | H01G 2/04 |
| | | | 361/830 |
| 2010/0188800 A1* | 7/2010 | Ashizaki | H01G 11/12 |
| | | | 361/502 |
| 2013/0029540 A1 | 1/2013 | Tong et al. | |
| 2013/0157113 A1* | 6/2013 | Yoshioka | H01M 2/204 |
| | | | 429/158 |
| 2014/0242436 A1 | 8/2014 | Pyzza et al. | |

FOREIGN PATENT DOCUMENTS

| | | | | | |
|---|---|---|---|---|---|
| CN | 102208718 A | * | 10/2011 | | |
| CN | 204793010 U | | 11/2015 | | |
| CN | 205680559 U | | 11/2016 | | |
| JP | 11067184 A | * | 3/1999 | | |
| JP | 2004335702 | | 11/2004 | | |
| JP | 2015041532 | | 3/2015 | | |
| KR | 20120004189 A | * | 1/2012 | .......... | H01M 2/1077 |
| WO | WO-2015012333 A1 | * | 1/2015 | ........... | H01M 2/202 |
| WO | WO-2016009786 A1 | * | 1/2016 | ............. | H01M 2/30 |

OTHER PUBLICATIONS

Product Sheet—Special 75 mm2 copper braid busbar—https://tranect.co.uk/tag/copper-braid-busbar/—post Jan. 2017 (Year: 2017).*
Tech Sheet LA8 Flexible Braid Connectors, OZ Gedney, 2007 (Year: 2007).*
Tech Sheet Braided Flexible Connectors, Watteredge, 2007 (Year: 2007).*
Tech Sheet Boreal Flexible Braids, google indexed Jan. 14, 2013 (Year: 2013).*
Tech SHeet, 19" Bus Bar, TXM, Apr. 2017 (Year: 2017).*
Amazon.com product, Low-Z Copper Strap, Mathews Engineering, Aug. 15, 2014 (Year: 2014).*
Powerline Equipment—Copper flexible Braid Connections (Year: 2014).*
Erico—Eriflex—Flexible Conductors—Solutions to optimized the designed of electrical power and ground connections (North America). (Year: 2012).*
Tyco product sheet, 2006 (Year: 2006).*
International Search Report and Written Opinion for PCT/US2018/038256 dated Oct. 8, 2018, 13 pages.
European Search Report for PCT/US2018/038256 dated Mar. 15, 2021, 7 pages.

* cited by examiner

INTERCONNECT STRIP FOR AN ULTRACAPACITOR MODULE

CROSS REFERENCE TO RELATED APPLICATION

The present application claims filing benefit of U.S. Provisional Patent Application Ser. No. 62/527,345 having a filing date of Jun. 30, 2017, which is incorporated herein by reference in its entirety.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. In certain cases, individual double layer capacitors may be combined together to form a module having a raised output voltage or increased energy capacity. The capacitors within a module are typically connected together by a bus bar that is welded to the terminals. One problem with such modules, however, is that they are relatively sensitive to vibrational forces that can occur during installation or use. That is, strong vibrational forces can sometimes cause the connection to be damaged or even broken, which can result in poor electrical performance. As such, a need currently exists for an ultracapacitor module that is capable of withstanding a wide variety of conditions without sacrificing electrical performance.

SUMMARY OF THE INVENTION

In accordance with one embodiment of the present invention, a module is disclosed that comprises a first ultracapacitor having a first terminal, a second ultracapacitor having a second terminal, and an interconnect strip. The interconnect strip contains a central section positioned between a first attachment section and a second attachment section. The first terminal of the first ultracapacitor is connected to the first attachment section of the strip and the second terminal of the second ultracapacitor is connected to the second attachment section of the strip. Further, the central section is formed from a flexible conductive material.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
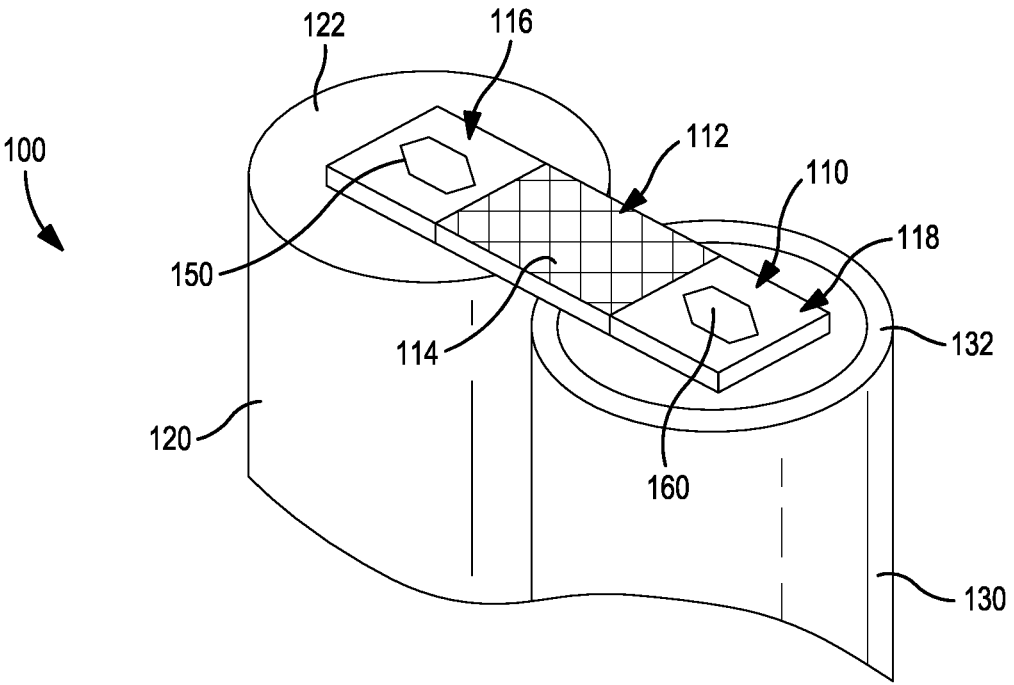
FIG. 1 is a perspective view showing a portion of one embodiment of the module of the present invention.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a module that contains a first ultracapacitor having a first terminal (e.g., positive terminal) and a second ultracapacitor having a second terminal (e.g., positive or negative terminal). The first and second terminals of the ultracapacitors are connected together with a interconnect strip, at least a portion of which is formed from a flexible conductive material. For example, the interconnect strip typically contains a central section that is positioned between first and second attachment sections located at opposing ends of the strip. By selectively controlling the geometry of these sections and the manner in which they are formed, the central section can be made flexible in that it is capable of being deformed in one or more directions when applied with a vibrational force. In this manner, the module can maintain good electrical properties under a wide variety of conditions.

Figure 3:
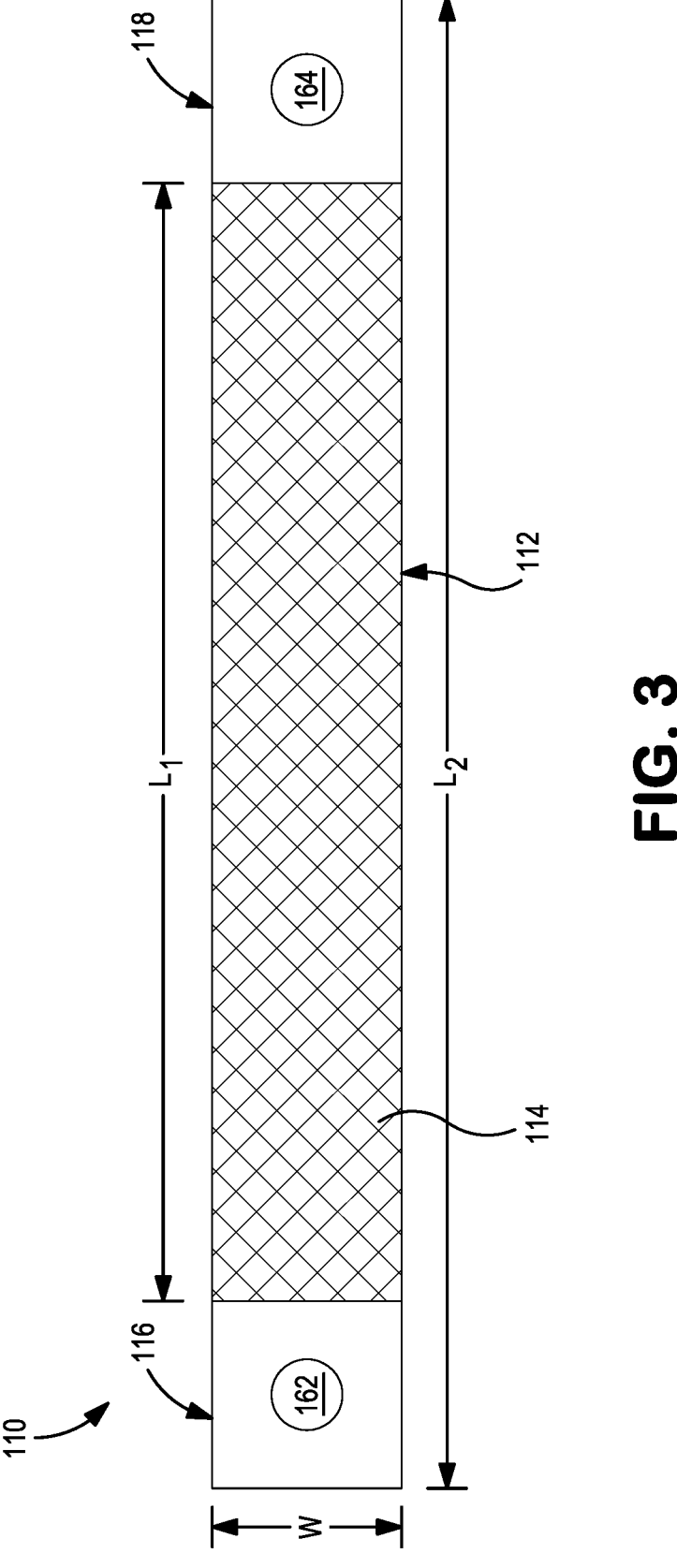
FIG. 3 is a top view of one embodiment of an interconnect strip that can be employed in the module of the present invention.

Referring to FIG. 3, one particular embodiment of an interconnect strip 110 is shown in more detail. As shown, the strip 110 contains a central section 112 that is positioned between a first attachment section 116 and a second attachment section 118. The central section 112 can be made flexible using a variety of techniques as is known in the art. For example, in certain embodiments, the central section 112 can be formed from a flexible conductive material that is in the form of one or more wires, braids, coils, sheets, bars, etc. In one embodiment, for instance, the flexible conductive material may be in the form of a sheet that contains one or more thin conductive layers. In another embodiment, as shown in FIG. 3, however, the flexible conductive material may be in the form of braids 114. Regardless of its form, any of a variety of different conductive materials may be employed, such as copper, tin, nickel, aluminum, etc., as well as alloys and/or coated metals. If desired, the conductive material may optionally be insulated with a sheath material.

In addition to controlling the material and form of the flexible conductive material, the geometry of the central section 112 can also be controlled to help provide the desired degree of flexibility. For example, the ratio of the length of the central section 112 ("$L_1$") to the length of the strip ("$L_2$") is generally selected to fall within a range of from about 0.6 to about 0.95, in some embodiment from about 0.7 to about 0.9, and in some embodiments, from about 0.75 to about 0.85. The length of the central section 112 may, for instance, range from about 50 to about 500 millimeters, in some embodiments from about 70 to about 400 millimeters, and in some embodiments, from about 80 to about 300 millimeters, while the length of the entire strip 110 may be from about 60 to about 600 millimeters, in some embodiments from about 80 to about 500 millimeters, and in some embodiments, from about 100 to about 400 millimeters. The width "W" of the strip may likewise range from about 1 to about 50 millimeters, in some embodiments from about 5 to about 40 millimeters, and in some embodiments, from about 10 to about 20 millimeters, while the thickness or height may range from about 0.05 to about 10 millimeters, in some embodiments from about 0.1 to about 8 millimeters, and in some embodiments, from about 0.5 to about 5 millimeters.

Figure 2:
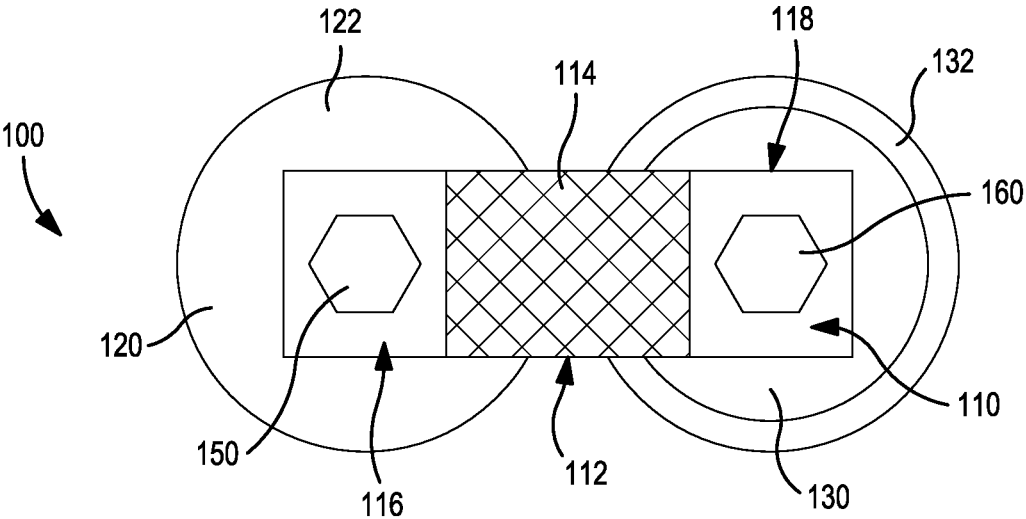
FIG. 2 is a top view of the module of FIG. 1.

The manner in which the interconnect strip 110 is attached to ultracapacitors may vary as is known in the art. In one embodiment, for instance, the first attachment section 116 defines a first opening 162 and the second attachment section 118 defines a second opening 164. The openings 162 and 164 are generally configured to receive a terminal of different ultracapacitors. Referring to FIGS. 1-2, for example, a module 100 is shown that contains a first ultracapacitor 120 and a second ultracapacitor 130 that are connected together through the attachment sections 116 and 118 of the interconnect strip 110. More particularly, in the illustrated embodiment, a terminal (not shown) of the first ultracapacitor 120 is inserted into the opening 162 and joined to the strip 110 with a fastening device 150. Similarly, a terminal (not shown) of the second ultracapacitor 130 is inserted into the opening 164 and joined to the strip 110 with another fastening device 160, which may be the same or different than the fastening device 150. Suitable fastening devices may include, for instance, nuts, washers, bolts, screws, compression or expansion fittings, etc. If desired, the fastening devices may be further bonded (e.g., welded, adhesively attached, ultrasonically bonded, etc.) to the attachment sections to ensure that they strip remains securely joined to the ultracapacitors. Of course, in alternative embodiments, the fastening devices may be eliminated and the strip may be joined solely using other techniques, such as by welding. As is known in the art, the ultracapacitors may be electrically connected together in series or in parallel, depending on the particular properties desired. For instance, the ultracapacitors may be electrically connected in series such that a terminal of a certain polarity (e.g., positive) of one ultracapacitor is connected to a terminal of opposite polarity (e.g., negative) of another ultracapacitor. In FIGS. 1-2, for instance, the positive terminal may extend from a top portion 122 of the first ultracapacitor 120 and the negative terminal may extend from a bottom portion 132 of the second ultracapacitor 130.

The module 100 shown in FIGS. 1-2 contains two ultracapacitors that are connected together in accordance with the present invention. Of course, it should be understood that the module may contain additional ultracapacitors, such as 4 or more, in some embodiments 6 or more, and in some embodiments, from 8 to 30 individual ultracapacitors. The additional ultracapacitors may be connected using the interconnect strip or through other techniques. For example, the interconnect strip 110 shown in FIG. 3 may also be employed to connect together third and fourth ultracapacitors. In such embodiments, the negative terminal located at the bottom portion (e.g., not shown) of the first ultracapacitor 120 may be connected to a positive terminal of a third ultracapacitor, and the positive terminal located at the top portion (not shown) of the second ultracapacitor 130 may be connected to a negative terminal of a fourth ultracapacitor. Of course, as will be understood by those skilled in the art, the particular number of ultracapacitors and the manner in which they are connected will depend on the desired electrical properties for the module.

Any of a variety of different individual ultracapacitors may generally be employed in the module of the present invention. Generally speaking, however, the ultracapacitor contains an electrode assembly and electrolyte contained and optionally hermetically sealed within a housing. The electrode assembly may, for instance, contain a first electrode that contains a first carbonaceous coating (e.g., activated carbon particles) electrically coupled to a first current collector, and a second electrode that contains a second carbonaceous coating (e.g., activated carbon particles) electrically coupled to a second current collector. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

First and second carbonaceous coatings are also electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about $0.2 \text{ cm}^3/\text{g}$ to about $1.5 \text{ cm}^3/\text{g}$, and in some embodiments, from about $0.4 \text{ cm}^3/\text{g}$ to about $1.0 \text{ cm}^3/\text{g}$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

If desired, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

Other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

The electrode assembly also typically contains a separator that is positioned between the first and second electrodes. If desired, other separators may also be employed in the electrode assembly. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

The manner in which the components of the electrode assembly are combined together may vary as is known in the art. For example, the electrodes and separator may be initially folded, wound, or otherwise contacted together to form an electrode assembly. In one particular embodiment, the electrodes, separator, and optional electrolyte may be wound into an electrode assembly having a "jelly-roll" configuration.

To form an ultracapacitor, an electrolyte is placed into ionic contact with the first electrode and the second electrode before, during, and/or after the electrodes and separator are combined together to form the electrode assembly. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

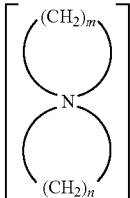

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis (pentafluoroethyl-sulfonyl)imide, bis (trifluoromethylsulfonyl)imide, bis(trifluoromethyl)imide, etc.); borates (e.g., tetrafluoroborate, tetracyanoborate, bis [oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); alum inates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

As noted above, the ultracapacitor also contains a housing within which the electrode assembly and electrolyte are retained and optionally hermetically sealed. The nature of the housing may vary as desired. In one embodiment, for example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, etc. Cylindrically-shaped containers are particular suitable.

Figure 4:
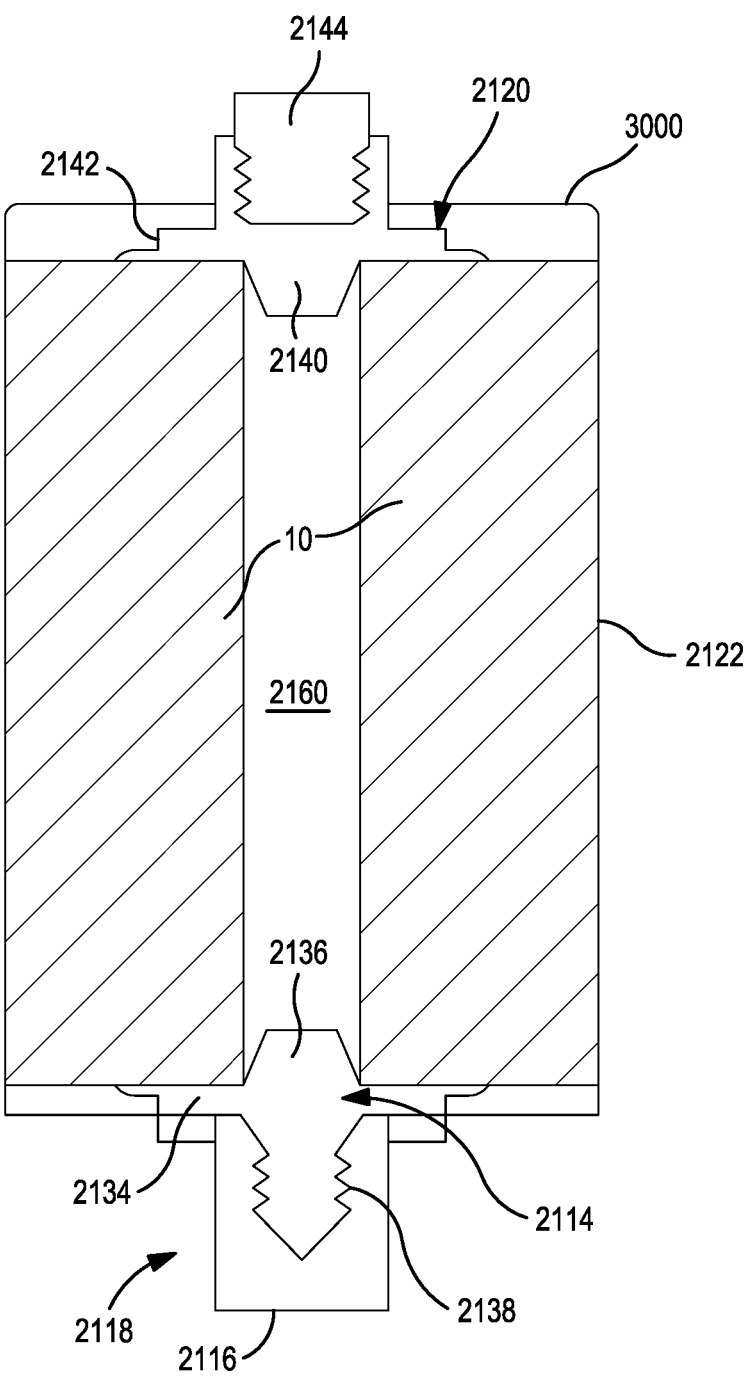
FIG. 4 is a schematic view of one embodiment of an ultracapacitor that may be employed in the module of the present invention.

Referring to FIG. 4, for instance, one embodiment of a housing that may be employed in the ultracapacitor is shown in more detail. In this particular embodiment, the housing contains a metal container 2122 (e.g., cylindrically-shaped can) that defines a base 3000 and an open end 3200. A lid 2118 is disposed over the open end 3200 and attached (e.g., welded) to the container 2122 to seal the housing. The lid 2118 may contain a first collector disc 2114, which includes a disc-shaped portion 2134, a stud portion 2136, and a fastener 2138 (e.g., screw). The collector disc 2114 is aligned with a first end of a hollow core 2160, which is formed in the center of the electrode assembly 10, and the stud portion 2136 is then inserted into an opening of the core so that the stud portion 2136 contacts the second current collector 40. In this manner, the second current collector 40 is placed into electrical contact with the lid 2118. The fastener 2138 may also be coupled (e.g., threadably connected) to a first terminal 2116. The metal container 2122 may likewise contain a second collector disc 2120, which includes a disc-shaped portion 2142, a stud portion 2140, and a second terminal 2144. The second collector disc 2120 is aligned with the second end of the hollow core 2160, and the stud portion 2140 is then inserted into the opening of the core so that the stud portion 2140 contacts the current collector 20. In this manner, the first current collector 20 is placed into electrical contact with the base 3000. Once formed, the terminals 2144 and 2116 may be connected with one or more additional ultracapacitors as described above. For example, the terminal 2144 (e.g., positive) may be connected with a terminal of an opposite polarity (e.g., negative) of a second ultracapacitor while the terminal 2116 (e.g., negative) may be connected with a terminal of opposite polarity (e.g., positive) of a third ultracapacitor.

Although not illustrated in the figures, the ultracapacitors and modules may also include balancing circuits. In general, balancing circuits are employed to prevent current, such as leakage current, from causing damage to other ultracapacitor through over-voltage. Such balancing can help regulate the voltage across each ultracapacitor such that they are substantially the same. The module and balancing circuit may also include a current control device for controlling the current flowing through the ultracapacitors according to a signal provided by a feedback loop. In this regard, the balancing circuit is not necessarily limited. So long as the balancing circuit can effectively balance the voltage across the ultracapacitors, it may be employed with the modules of the present invention. In general, the balancing circuits are electrically connected to the ultracapacitors. Such electrical connection is not necessarily limited so long as it allows for controlling and/or regulating the voltage of the ultracapacitors. The balancing circuits may include any number of electronic components, including active and passive components. The components can include any combination of transistors, resistors, regulators, attenuators, potentiometers, thermistors, diodes (e.g., Zener diodes), comparators (e.g., voltage comparators), amplifiers (e.g., operational amplifiers), voltage dividers, etc. It should be appreciated that these electronic components may be configured in any manner of ways in order to effectively balance a circuit. In some instances, the balancing circuits may include additional components such as alarms (e.g., sound or light such as LEDs) to notify the presence of an over-voltage. Examples of balancing circuits that may be employed include those as U.S. Pat. No. 6,806,686 to Thrap, U.S. Pat. No. 7,880,449 to Thrap, U.S. Publication No. 2003/0214267 to Long, and U.S. Publication No. 2016/0301221 to Kaminsky. Furthermore, any number of balancing circuits may be employed. For instance, the module may contain at least one balancing circuit per ultracapacitor. Alternatively, the module may employ at least one balancing circuit for a plurality of ultracapacitors.

In addition, the balancing circuits may be connected to a heat dissipation component. The heat dissipation component can be present anywhere on the module or ultracapacitors and may not be limited. For instance, it may be present be on the circuit. Alternatively, or in addition, the component may be connected to a heat sink, such as a metal. Such metal employed as the heat sink may include a metal casing that at least partially or completely surrounds the module and/or ultracapacitors. Alternatively, or in addition, the metal employed as a heat sink may be another structural component of the module and/or ultracapacitors. For instance, the metal may be a brace or structural component surrounding the module and/or ultracapacitors. Such brace or structural component may serve a dual function of also providing mechanical stability. Such connection of the balancing circuits to the heat dissipation component can allow for effective and efficient heat dissipation without compromising the performance of the ultracapacitor or the balancing circuit. Furthermore, any number of heat dissipation components may be employed. For instance, the module may contain at least one heat dissipation component per ultracapacitor. Alternatively, the module may employ at least one heat dissipation component for a plurality of ultracapacitors.

Ultracapacitors and modules containing them can be employed to store large amounts of electrical charge. As a result, the modules and ultracapacitors of the present invention can be employed in a variety of applications. For instance, they can be used in a variety of energy applications including, but not limited to, wind turbines, solar turbines, solar panels, and fuel cells. In addition, they can also be used in a variety of transportation applications including, but not limited to, vehicles (e.g., battery propelled electric vehicles, hybrid electric vehicles including buses, engine starts, power and braking recuperation systems, etc.), trains and trams (e.g., maglev trains, track switching, starter systems, etc.), and aerospace (e.g., actuators for doors, evacuation slides, etc.). They also have a variety of industrial applications including automation (e.g., robotics, etc.), vehicles (e.g., fork lifts, cranes, electric carts, etc.). They also have a variety of applications in consumer electronics (e.g., portable media players, hand-held devices, GPS, digital cameras, etc.), computers (e.g., laptop computers, PDAs, etc.), and communications systems. The modules and ultracapacitors may also have a variety of military applications (e.g., motor startups for tanks and submarines, phased array radar antennae, laser power supplies, radio communications, avionics display and instrumentation, GPS guidance, etc.) and medical applications (e.g., defibrillators, etc.).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A module comprising:
   a first ultracapacitor having a first terminal;
   a second ultracapacitor having a second terminal; and
   an interconnect strip that contains a central section positioned between a first attachment section and a second attachment section wherein the thickness of the strip is from about 0.05 to 5 millimeters, the length of the strip is from about 60 to about 400 millimeters, and the width of the strip is from about 1 to about 20 millimeters,
   wherein the first terminal of the first ultracapacitor is connected to the first attachment section of the strip and the second terminal of the second ultracapacitor is connected to the second attachment section of the strip, and further wherein the central section is formed from a flexible conductive material, wherein the flexible conductive material includes copper, tin, nickel, aluminum, or a combination thereof, and the central section is in the form of only one of wires, braids, coils, sheets, or bars and wherein the ratio of the length of the central section to the length of the strip is from greater than 0.75 to 0.85,
   wherein the first attachment section defines a first opening through which the first terminal is received and the second attachment section defines a second opening through which the second terminal is received, wherein a fastening device connects the first attachment section to the first terminal and the second attachment section to the second terminal, further wherein the first attachment section is welded to the first terminal and the second attachment section is welded to the second terminal.

2. The module of claim 1, wherein the flexible conductive material is in the form of only one of wires, coils, sheets, or bars.

3. The module of claim 1, wherein the flexible conductive material is only in the form of braids.

4. The module of claim 1, wherein the flexible conductive material includes only one of copper, tin, nickel, or aluminum.

5. The module of claim 1, wherein the ratio of the length of the central section to the length of the strip is from greater than 0.75 to less than 0.85.

6. The module of claim 5, wherein the length of the central section is from about 50 to about 300 millimeters.

7. The module of claim 1, wherein the width of the strip is from about 10 to about 20 millimeters.

8. The module of claim 1, wherein the thickness of the strip is from about 0.5 to 5 millimeters.

9. The module of claim 1, wherein the first terminal and the second terminal have an opposite polarity.

10. The module of claim 1, wherein the module contains from 8 to 30 ultracapacitors.

11. The module of claim 1, wherein each of the ultracapacitors comprises:

an electrode assembly comprising a first electrode, a second electrode, and a separator positioned between the first and second electrodes;

a nonaqueous electrolyte that is in ionic contact with the first electrode and the second electrode; and a housing within which the electrode assembly and the electrolyte are contained.

12. The module of claim 11, wherein the first electrode comprises a first current collector electrically coupled to a first carbonaceous coating and the second electrode comprises a second current collector electrically coupled to a second carbonaceous coating.

13. The module of claim 12, wherein the first current collector and the second current collector each contain a substrate that includes a conductive metal.

14. The module of claim 13, wherein the conductive metal is aluminum or an alloy thereof.

15. The module of claim 12, wherein the first carbonaceous coating, the second carbonaceous coating, or both contain activated carbon particles.

16. The module of claim 11, wherein the separator includes a cellulosic fibrous material.

17. The module of claim 11, wherein the electrode assembly has a jellyroll configuration.

18. The module of claim 11, wherein the nonaqueous electrolyte contains an ionic liquid that is dissolved in a nonaqueous solvent, wherein the ionic liquid contains a cationic species and a counterion.

19. The module of claim 18, wherein the nonaqueous solvent includes propylene carbonate, a nitrile, or a combination thereof.

20. The module of claim 11, wherein the cationic species includes an organoquaternary ammonium compound.

21. The module of claim 11, wherein the housing includes a container having a base and an open end, wherein a lid is disposed adjacent to the open end, and further wherein the electrode assembly is positioned within the housing.

22. The module of claim 21, wherein the container is formed from a metal.

23. The module of claim 21, wherein the container has a cylindrical shape.

* * * * *